US007730706B2

(12) United States Patent
Ogata et al.

(10) Patent No.: US 7,730,706 B2
(45) Date of Patent: Jun. 8, 2010

(54) LAWN MOWER WITH PIVOTABLE GRASS COLLECTOR

(75) Inventors: Satoshi Ogata, Sakai (JP); Masashi Osuga, Nara (JP); Takashi Shibata, Sakai (JP); Takashi Kuramoto, Sakai (JP); Hironobu Nishihara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/051,818

(22) Filed: Mar. 19, 2008

(65) Prior Publication Data

US 2008/0276589 A1 Nov. 13, 2008

(30) Foreign Application Priority Data

May 9, 2007 (JP) ............... 2007-124790

(51) Int. Cl.
*A01D 43/06* (2006.01)

(52) U.S. Cl. .......................... 56/203; 56/204

(58) Field of Classification Search .............. 56/194, 56/202–206
See application file for complete search history.

(56) References Cited

U.S. PATENT DOCUMENTS

| 1,925,296 | A | * | 9/1933 | Barrett | 298/22 R |
| 4,019,781 | A | * | 4/1977 | Ray | 298/22 J |
| 4,129,333 | A | * | 12/1978 | Kidd | 298/22 R |
| 4,345,416 | A | * | 8/1982 | Cameron | 56/13.3 |
| 4,476,668 | A | | 10/1984 | Reilly | |
| 6,196,634 | B1 | * | 3/2001 | Jurinek | 298/1 A |
| 6,449,933 | B1 | * | 9/2002 | Umemoto et al. | 56/13.3 |
| 6,513,312 | B1 | * | 2/2003 | Ishimori et al. | 56/203 |
| 6,584,757 | B2 | * | 7/2003 | Komorida et al. | 56/202 |
| 7,325,389 | B2 | * | 2/2008 | Walker | 56/205 |
| 2006/0042214 | A1 | * | 3/2006 | Asahara et al. | 56/202 |

FOREIGN PATENT DOCUMENTS

| JP | 4258209 | A | | 9/1992 |
| JP | 5015229 | A | | 1/1993 |
| JP | 05076231 | A | * | 3/1993 |
| JP | 2001095344 | A | | 4/2001 |
| JP | 2004305156 | A | * | 11/2004 |
| JP | 2005348653 | A | * | 12/2005 |

* cited by examiner

*Primary Examiner*—Thomas B Will
*Assistant Examiner*—Joan D Misa
(74) *Attorney, Agent, or Firm*—The Webb Law Firm

(57) ABSTRACT

A lawn mower, comprising a vehicle body that is supported by a plurality of wheels; a support frame that is connected to a rear part of the vehicle body; a grass collector that is supported on the support frame so as to be pivoted between a grass collecting position and a discharge position about an axis oriented in the transverse direction of the vehicle body, the grass collector having a bottom surface; a swiveling body that is connected to a rotating shaft of the grass collector to be rotated in unison so as to switch the grass collector between the grass collecting position and the discharge position; and a cylinder connected to the swiveling body and to the support frame; wherein the swiveling body and the cylinder are disposed below the grass collector in the grass collecting position, and the cylinder extends along the bottom surface of the grass collector.

7 Claims, 6 Drawing Sheets

LAWN MOWER WITH PIVOTABLE GRASS COLLECTOR

BACKGROUND OF THE INVENTION

1. Field of the Invention

The present invention relates to a lawn mower provided with a support frame that is connected to a rear part of a vehicle body; and a grass collector that is supported on the support frame so as to be capable of swiveling around a transverse shaft to switch between a grass collecting position and a discharge position.

2. Description of the Related Art

In a lawn mower of such description, switching between the discharge position and the grass collecting position of the lawnmower is performed using a discharge cylinder. A conventional example is disclosed in Japanese Laid-open Patent Application 2001-95344.

The lawn mower disclosed in the above document is provided with a pair of left and right vertical support frames that are connected to a rear part of a machine body frame; a raising/lowering frame that is vertically movably connected to the left and right pair of vertical support frames using a vertical member; a grass collector that is supported on the raising/lowering frame; and an opening and closing cylinder provided to a left side of the grass collector.

The grass collector is rotatably supported around a transverse support point on a rear end part of a longitudinally oriented member of the raising/lowering frame. The opening/closing cylinder is disposed between a reinforcement member of the grass collector and the longitudinally oriented member of the raising/lowering frame, and swivels the grass collector upward around the support point to a discharge position, or swivels the grass collector downward around the support point to a grass collecting position.

In the lawn mower described above, when the conventional technique described above is used in order to enable a discharge cylinder to switch the grass collector between the grass collecting position and the discharge position, problems tend to arise in relation to the number of discharge cylinders that are required and the positions to which the grass collector is switched.

Specifically, using the conventional technique described above will cause the discharge cylinder to be positioned on a lateral exterior side of the grass collector. In this case, when fewer discharge cylinders are provided, the swiveling of the grass collector as carried out by the discharge cylinder occurs on one side of the grass collector, which will cease to swivel smoothly. In order to prevent this problem, discharge cylinders must be provided to both sides of the grass collector, and the number of required discharge cylinders increases.

SUMMARY OF THE INVENTION

An object of the present invention is to provide a lawn mower in which cut grass can be discharged from a grass collector using a small number of discharge cylinders, and in which the grass collector can be disposed as low as possible.

A lawn mower, comprising a vehicle body that is supported by a plurality of wheels; a support frame that is connected to a rear part of the vehicle body; a grass collector that is supported on the support frame so as to be pivoted between a grass collecting position and a discharge position about an axis oriented in the transverse direction of the vehicle body, the grass collector having a bottom surface; a swiveling body that is connected to a rotating shaft of the grass collector to be rotated in unison so as to switch the grass collector between the grass collecting position and the discharge position; and a cylinder connected to the swiveling body and to the support frame; wherein the swiveling body and the cylinder are disposed below the grass collector in the grass collecting position, and the cylinder extends along the bottom surface of the grass collector.

The discharge cylinder swivels the swiveling body below the grass collector, whereby the swiveling body causes the rotating support shaft to rotate, and the grass collector is switched to the grass collecting position or the discharge position. As a result, the discharge cylinder is disposed in a center part, or the vicinity thereof, of the grass collector in the transverse direction, whereby the grass collector can be smoothly switched to the grass collecting position by the discharge cylinder, even when the number of necessary discharge cylinders is reduced.

As a result, when the grass collector is collecting grass, the discharge cylinder will be positioned along or near the bottom wall of the grass collector, and the height at which the grass collector is disposed is markedly reduced.

In this embodiment, the bottom surface of the grass collector is preferably formed in a concave part that is formed in a bottom wall of the grass collector, and is generally oriented downward when the grass collector is in the grass collecting position; and when the grass collector is in the grass collecting position, the swiveling body and the cylinder are located within the concave part.

In this embodiment, the cylinder preferably has a longitudinal direction in which the cylinder extends; the swiveling body and the cylinder are connected via a pivot shaft; and, in a lateral view, an angle formed by a line connecting the rotating shaft and the pivot shaft and by the longitudinal direction of the cylinder exceeds through 90° in a process in which the grass collector is moved from the grass collecting position to the discharge position.

As a result, the operating force applied by the cylinder to the swiveling body can be most efficiently used in order to cause the pivot shaft to rotate.

In this embodiment, the lawn mower preferably comprises an operator's area; an engine disposed forwardly of the an operator's area wherein the plurality of wheels have a pair of front wheels and a pair of rear wheels; a mower unit disposed between the pair of front wheels and the pair of rear wheels; and a duct that extends between the mower unit and the grass collector so that the duct extends along a longitudinal direction at a position between the pair of rear wheels.

In this embodiment, the lawn mower preferably comprises the bottom wall of the grass collector being generally inclined rearward and upward in a lateral view when the grass collector is in the grass collecting position.

In this embodiment, the bottom wall of the grass collector is preferably generally inclined rearward and upward in a lateral view when the grass collector is in the grass collecting position.

In this embodiment, the cylinder is preferably disposed at a rearward position of the bottom surface of the grass collector.

DESCRIPTION OF THE PREFERRED EMBODIMENTS

Embodiments of the present invention will be described below with reference to the drawings.

Figure 1:
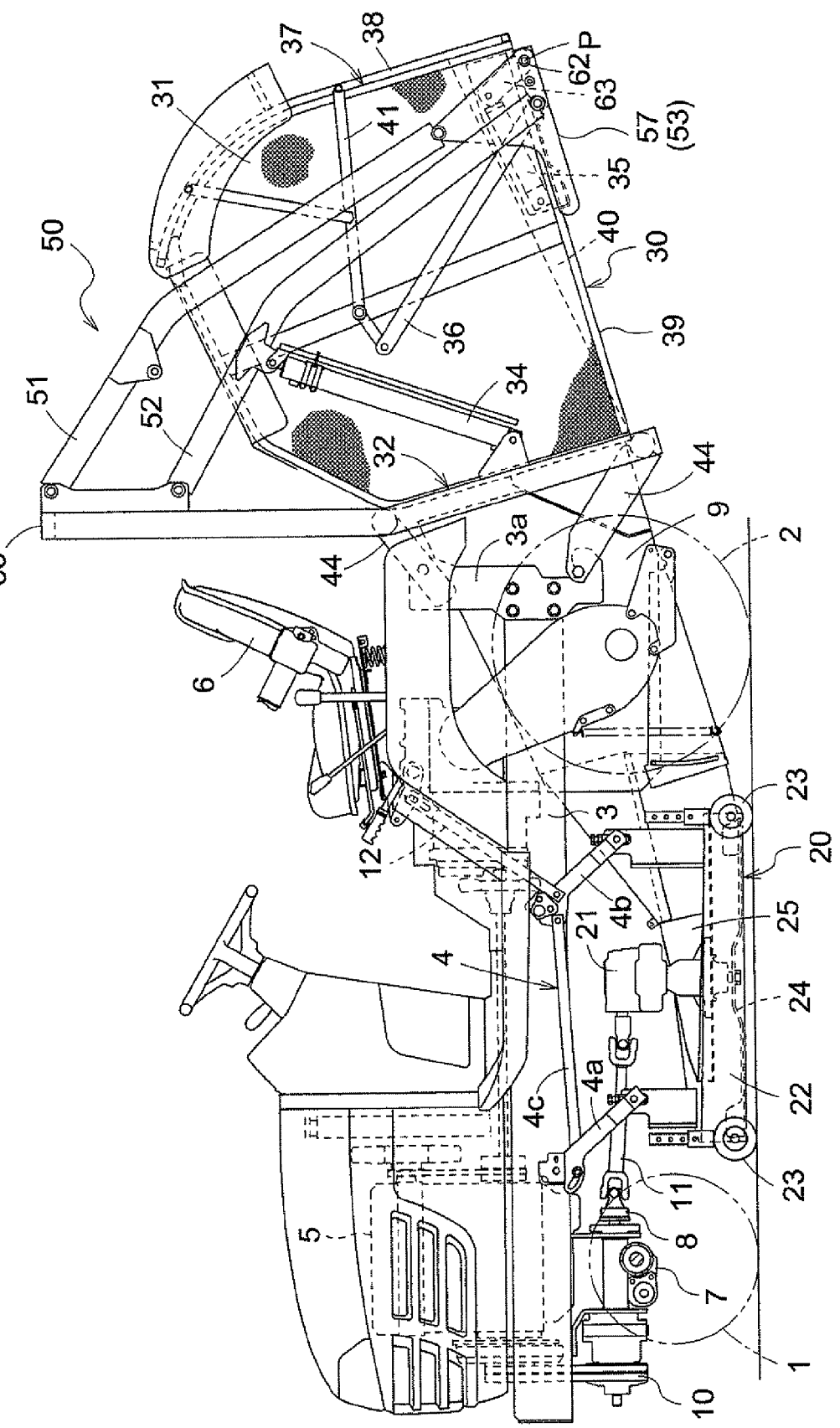
FIG. 1 is a side view of an entirety of a lawn mower.

FIG. 1 is an overall side view of a lawn mower according to an embodiment of the present invention. As shown in FIG. 1, the lawnmower according to an embodiment of the present invention is provided with a riding-type self-propelled vehicle that is propelled by a pair of left and right steerable and driveable front wheels 1, 1, and a pair of left and right driveable rear wheels 2, 2; a mower unit 20 that is connected via a linking mechanism 4 to a vehicle body frame 3 of the self-propelled vehicle between the front and rear wheels; and a grass collecting part 30 that is equipped with a grass collector 31 that is positioned rearward of the vehicle body of the self-propelled vehicle.

The self-propelled vehicle is also provided with not only the pair of left and right front wheels 1, 1 and the pair of left and right rear wheels 2, 2*a*, but also a motive source, in which an engine 5 is mounted, and which is provided to a front part of the vehicle body so as to transmit drive force to the front wheels 1 and the rear wheels 2; an operating part that is equipped with an operating seat 6 provided to the rear part of the vehicle body; a power take-off shaft 8 that is supported by a front wheel drive case 7 and is disposed in the longitudinal direction of the vehicle body; and a conveying duct 9 that passes between the left and right rear wheels 2 in the longitudinal direction of the vehicle body.

The power take-off shaft 8 is driven by a drive force that is transmitted from an output shaft of the engine 5 via a transmission belt 10. The drive force is transmitted to a cutting blade drive mechanism 21 of the mower unit 20 via a rotating shaft 11. The power take-off shaft 8 is rotatably supported about an axis that is aligned with the roll axis, which is oriented in the longitudinal direction of the vehicle, and in which the front wheel drive case 7 rolls with respect to the vehicle body frame 3.

The linking mechanism 4 is provided with a pair of left and right front swiveling links 4*a*, 4*a* that connect the vehicle body frame 3 and a front part of a cutting blade housing 22 of the mower unit 20; a pair of left and right rear swiveling links 4*b*, 4*b* that connect the vehicle body frame 3 and a rear part of the cutting blade housing 22 of the mower unit 20; a connecting link 4*c* that connects the front swiveling link 4*a* and the rear swiveling link 4*b* on the left side; and a connecting link 4*c* that connects the front swiveling link 4*a* and the rear swiveling link 4*b* on the right side. The pair of left and right rear swiveling links 4*b*, 4*b* move in association with a hydraulic cylinder (not shown) via an associated movement member 12.

Specifically, the linking mechanism 4 is made to swivel up and down with respect to the vehicle body frame 3 by the hydraulic cylinder. The mower unit 20 is thereby lowered to a lowered operating state in which a ground gauge wheel 23 comes in contact with the ground surface, or raised to a raised non-operating state in which the ground gauge wheel is raised from the ground.

When the mower unit 20 is set to the lowered operating state and the self-propelled vehicle is operated, the mower unit 20 performs a grass-cutting process as described below.

Specifically, the mower unit 20 has a plurality of cutting blades 24 positioned inside the cutting blade housing 22 along the transverse direction of the vehicle body. The blades 24 are driven by the blade drive mechanism 21 so as to rotate around axes oriented in the vertical direction of the vehicle body, and cut the grass. A conveying stream of air generated by the rotation of the cutting blades 24 discharges the grass cut by the blades into the conveying duct 9 from a cut grass outlet 25, which is positioned in a center portion of the cutting blade housing 22 in the transverse direction of the vehicle body.

The conveying duct 9 is made to communicate with the cut grass outlet 25 of the mower unit 20 and a cut grass inlet 32 of the grass collector 31. The cut grass discharged from the cut grass discharge outlet 25 (*1) is fed to the grass collector 31 by the conveying stream of air of the cutting blades 24.

As shown in FIG. 1, the grass collecting part 30 is not only provided with a grass collector 31, but also a support frame 50 that has a fixed frame 33 that is connected to a rear part of the vehicle body frame 3; raising/lowering cylinders 34 that are connected to a pair of left and right raising/lowering arms 52 of the support frame; a discharge cylinder 35 that is supported on a holding frame 53 of the support frame 50; and container opening/closing rods 36 that are provided to both lateral sides of the grass collector 31.

Figure 2:
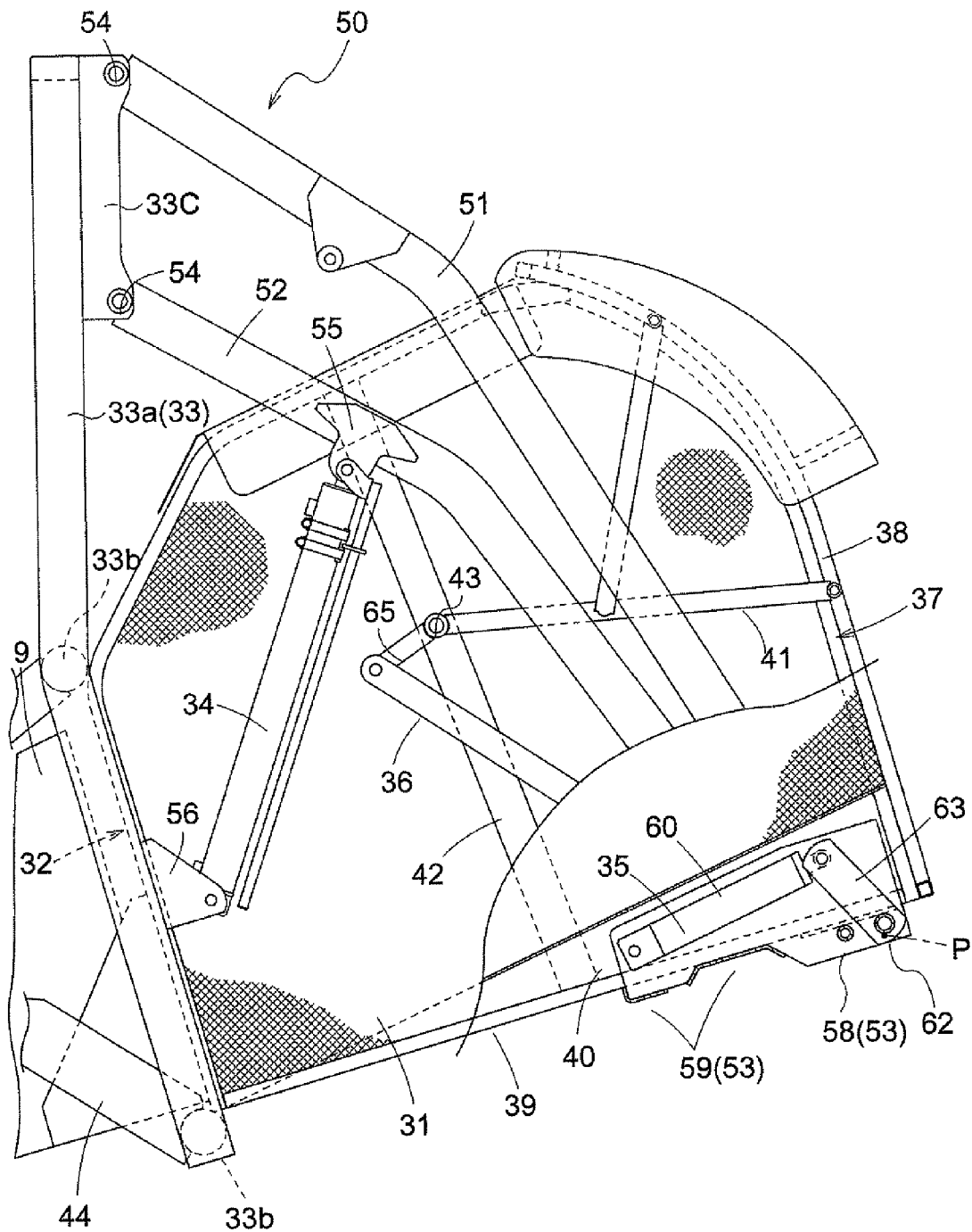
FIG. 2 is a side view of a grass collector in a grass collecting position.
Figure 3:
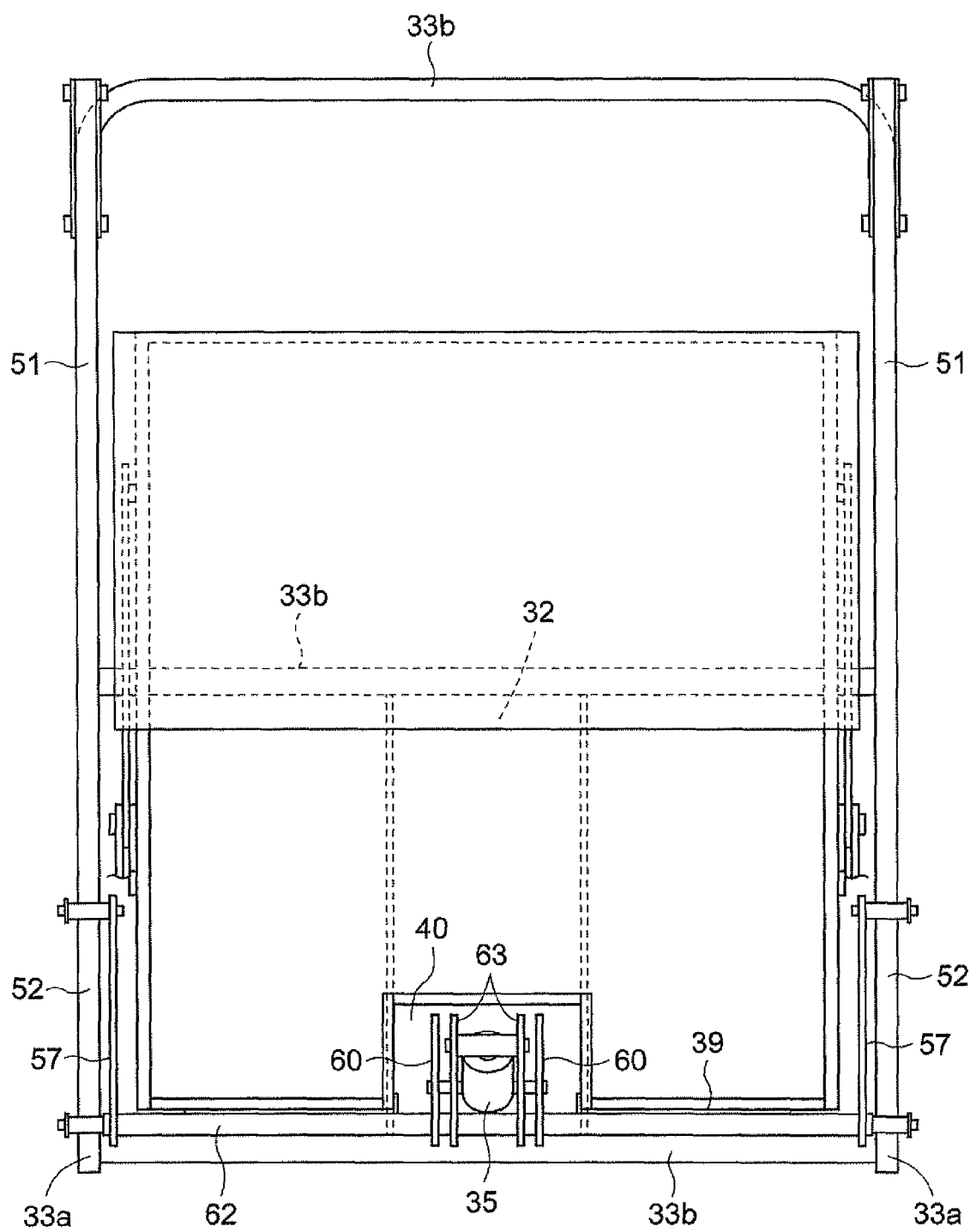
FIG. 3 is a rear view of a grass collecting part.

As shown in FIG. 2, the grass collector 31 is not only provided with the cut grass inlet 32, but also a discharge outlet 37 provided to the grass collector 31 toward the rear of the vehicle body, and a lid body 38 that opens and closes the discharge outlet 37. As shown in FIGS. 2 and 3, the grass collector 31 is provided with a concave part 40, which is provided to a bottom wall 39 of the grass collector. The concave part 40 is positioned in a center part of the bottom wall 39 along the transverse direction, opens downward from the grass collector, and is formed as a groove along the longitudinal direction of the bottom wall 39. The concave part 40 is formed to a shallow depth that approaches the front of the bottom wall 39.

The lid body 38 is supported on a frame body 42 of the grass collector 31 via lid support bodies 41 that are positioned on both sides of the grass collector 31. The pair of left and right lid support bodies 41, 41 is rotatably connected to the frame body 42 via connecting pins 43. The pair of left and right lid support bodies 41, 41 is swivelably operated up and down with respect to the grass collector 31, around an axis of the connecting pins 43 that is oriented in the transverse direction with respect to the vehicle body, and the lid body 38 thereby opens and closes the discharge outlet 37.

As shown in FIG. 2, the support frame 50 is not only provided with the fixed frame 33 and the holding frame 53, but also a pair of upper and lower raising/lowering arms 51, 52, which extend toward the rear of the vehicle body from a pair of left and right main frames 33*a*, 33*a* of the fixed frame 33, which are oriented in the vertical direction of the vehicle body.

As shown in FIGS. 2 and 3, the fixed frame 33 is provided not only with the pair of left and right main frames 33*a*, 33*a*, but also with a connecting frame 33*b*, which is oriented in the transverse direction of the vehicle body. The connecting frame 33*b* connects the pair of left and right main frames 33*a*, 33*a* at an upper end part, a middle part, and a lower end part of the fixed frame 33. The pair of left and right main frames 33*a*, 33*a* are detachably connected via a pair of upper and lower connecting members 44, 44 to a support part 3*a* established as a plate member connected to the vehicle body frame 3. The fixed frame 33 is thereby connected to the vehicle body frame 3.

As shown in FIGS. 2 and 3, the pair of upper and lower raising/lowering arms 51, 52 are supported via a connecting shaft 54 on support parts 33c so as to be swivelably raised and lowered. The support parts 33c are provided to upper ends of the main frames 33a.

Figure 4:
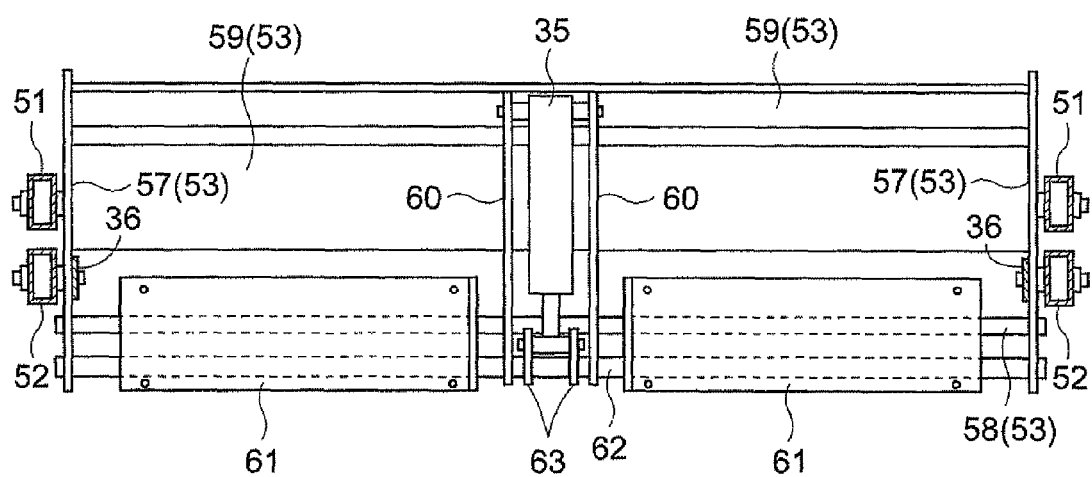
FIG. 4 is a plan view of a holding frame.

As shown in FIGS. 2, 3, and 4, the holding frame 53 comprises a connecting plate 57 that is connected to distal end parts of the pair of upper and lower raising/lowering arms 51, 52 on the left side; a connecting plate 57 that is connected to distal end parts of the upper and lower raising lowering arms 51, 52 on the right side; and a single connecting rod 58 and two bottom plates 59 that are connected across the pair of left and right connecting plates 57, 57. The holding frame 53 also has cylinder support plates 60, 60, also acting as cylinder covers, which are formed from a pair of left and right metal plates that are attached across the connecting rod 58 and the bottom plates 59.

The pair of left and right cylinder support plates 60, 60 and the pair of left and right connecting plates 57, 57 rotatably support a rotating support shaft 62 that is integrally and rotatably connected to the bottom wall 39 of the grass collector 31 via a pair of left and right connecting plates 61, 61. The support frame 50 thereby supports the grass collector 31 so as to be capable of swiveling up and down around an axis P of the rotating shaft 62 oriented in the transverse direction of the vehicle body.

The pair of left and right connecting plates 61, 61 are detachably connected to the bottom wall 39 of the grass collector 31 by a connecting bolt. The grass collector 31 can be detached from and attached to the support frame 50 between the connecting plates 61 and the bottom wall 39.

The raising/lowering cylinders 34 are connected across a bracket 55 provided to the lower raising/lowering arm 52 of the pair of upper and lower lowering/raising arms 51, 52; and a bracket 56 provided to the main frame 33a. The lowering/raising arms 51, 52 swivel upward and downward with respect to the fixed frame 33, and the grass collector 31 is thereby raised and lowered with respect to the vehicle body.

The discharge cylinder 35 is connected across a front end part of the pair of left and right cylinder support plates 60, 60, and a pair of left and right arm-shaped swiveling bodies 63, 63, which are integrally and rotatably connected to the rotating support shaft 62 between the pair of left and right cylinder support plates 60, 60. The pair of left and right swiveling bodies 63, 63 swivel around an axis P of the rotating support shaft 62, the rotating support shaft 62 is thereby rotated, and the grass collector 31 swivels upward and downward around the axis P oriented in the transverse direction of the vehicle body.

The container opening/closing rods 36 are connected across a connecting shaft 64 that connects the lower raising/lowering arm 52 and the connecting plates 57; and an operating arm 65 to which the lid support bodies 41 are integrally and rotatably provided. The grass collector 31 is swiveled with respect to the support frame 50, whereby the swiveling force of the grass collector 31 is used as an operating force, so that the lid body 38 is opened and closed.

Specifically, the grass collector 31 is vertically movably supported by the support frame 50 around an axis P oriented in the transverse direction of the vehicle body, so as to be capable of being switched to a grass collecting position or a discharge position. The pair of left and right raising/lowering cylinders 34, 34 and a single output cylinder 35 are used to switch the grass collector to a grass collecting position, a low discharge position, or a high discharge position.

Specifically, FIG. 2 is a side view of the grass collector 31 switched to the grass collecting position. As shown in FIG. 2, the pair of left and right raising/lowering cylinders 34, 34 are driven so as to retract (to the lowered side), and the discharge cylinder 35 is driven so as to retract (to the grass collecting side). As a result, the pair of left and right raising/lowering cylinders 34, 34 lower the pair of upper and lower raising/lowering arms 51, 52 with respect to the fixed frame 33, and the grass collector 31 is thereby lowered with respect to the vehicle body. The discharge cylinder 35 causes the swiveling bodies 63 to swivel and the rotating shaft 62 to rotate, whereby the grass collector 31 is swiveled toward the front of the vehicle body, around the axis P oriented in the transverse direction of the vehicle body. As a result, the cut grass inlet 32 of the grass collector 31 is made to communicate with an outlet of the conveying duct 9, the bottom wall 39 of the grass collector 31 extends across the bottom plate 59 of the holding frame 53, and the grass collector 31 is switched to the grass collecting position. At this point, the lid body 38 of the grass collector 31 is switched to a closed state by the swiveling of the lid support bodies 41 as performed by the pair of left and right container opening/closing rods 36, 36. The grass collector 31 thereby recovers and collects cut grass fed from the conveying duct 9.

In the state in which the grass collector 31 is switched to the grass collecting position, the discharge cylinder 35, the pair of left and right swiveling bodies 63, 63, and the pair of left and right cylinder support plates 60, 60 enter into the concave part 40 of the grass collector 31, and are positioned below the grass collector 31 while the center of gravity of the grass collector 31 is minimized.

Figure 5:
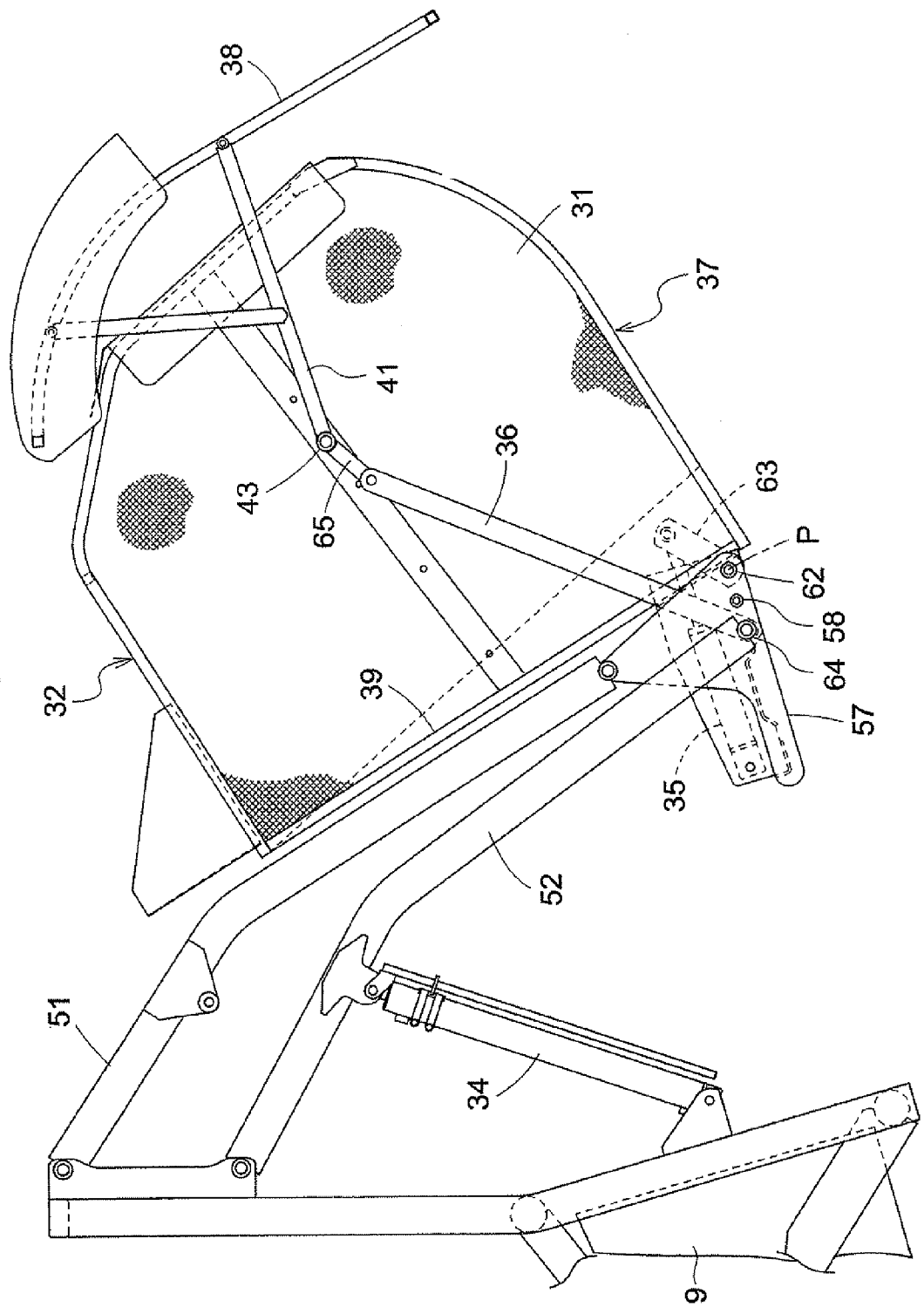
FIG. 5 is a side view of the grass collector when the discharge position is set low.

FIG. 5 is a side view of a state in which the grass collector 31 is switched to the low discharge position. As shown in FIG. 5, the pair of left and right raising/lowering cylinders 34, 34 are stopped in a retracted state, and the discharge cylinder 35 is driven so as to extend (to the discharge side). As a result, the discharge cylinder 35 causes the swiveling bodies 63 to swivel and causes the rotating shaft 62 to rotate. The grass collector 31 thereby swivels toward the rear of the vehicle body, around the axis P oriented in the transverse direction of the vehicle body. As a result, the cut grass inlet 32 of the grass collector 31 is moved upward and rearward away from the outlet of the conveying duct 9, and oriented upward relative to the vehicle body. The discharge outlet 37 of the grass collector 31 is oriented downward relative to the vehicle body, and the grass collector 31 is brought to the low discharge position. The lid body 38 of the grass collector 31 is then switched to an open state by the swiveling of the lid support bodies 41 performed by the pair of left and right container opening/closing rods 36, 36. As a result, the grass that has accumulated in the grass collector 31 falls unassisted from the discharge outlet 37, and is thereby discharged.

Figure 6:
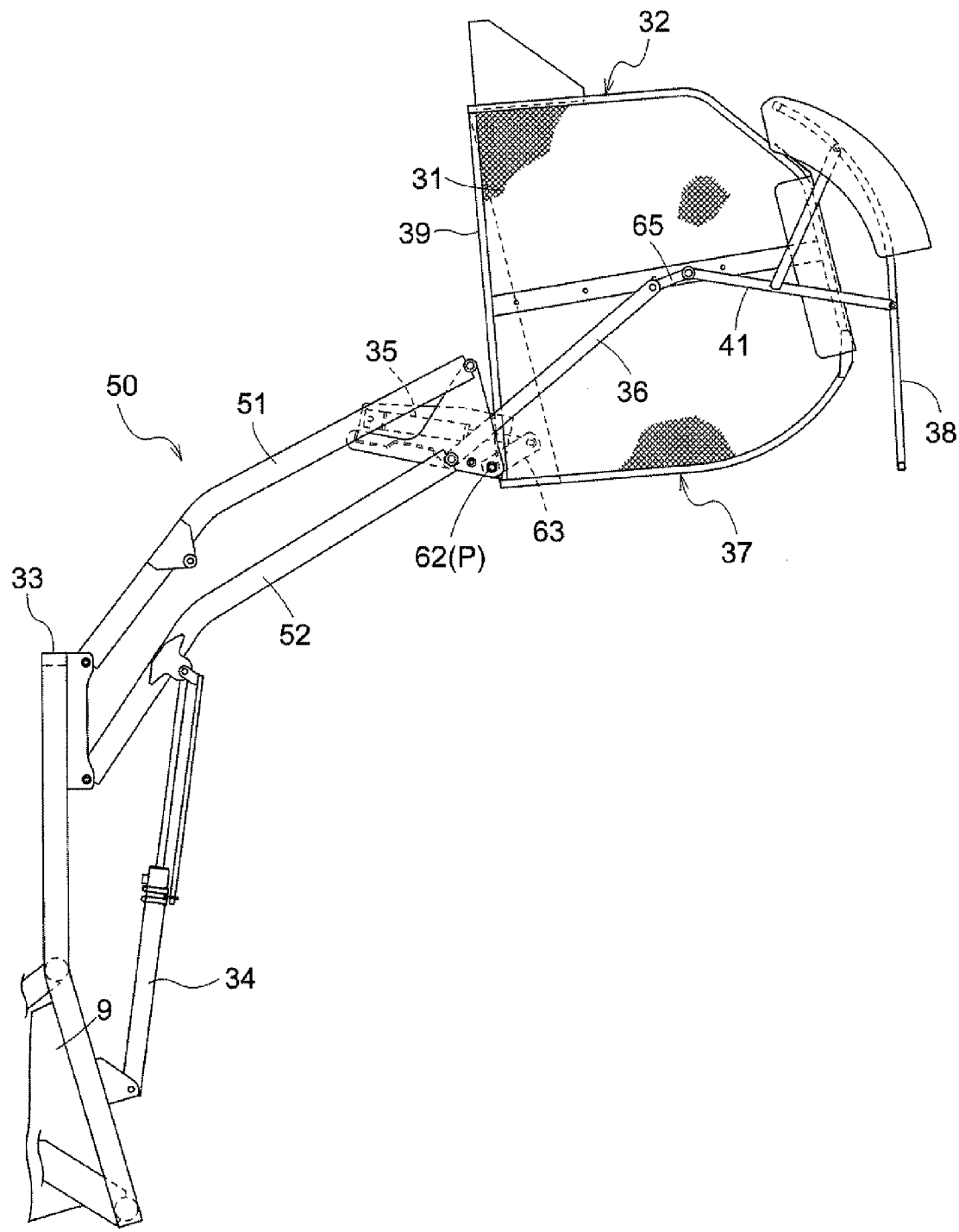
FIG. 6 is a side view of the grass collector when the discharge position is set high.

FIG. 6 is a side view of a state in which the grass collector 31 is switched to the high discharge position. As shown in FIG. 6, the pair of left and right raising/lowering cylinders 34, 34 are driven so as to extend (to the raising side), and the discharge cylinder 35 is driven so as to extend (to the discharging side). As a result, the pair of left and right raising/lowering cylinders 34, 34 raise the pair of upper and lower raising/lowering arms 51, 52 with respect to the fixed frame 33, and the grass collector 31 is thereby raised with respect to the vehicle body. The discharge cylinder 35 causes the swiveling bodies 63 to swivel and causes the rotating shaft 62 to rotate. The grass collector 31 thereby swivels toward the rear of the vehicle body, around the axis P oriented in the transverse direction of the vehicle body. As a result, the entire grass collector 31 is separated rearward and high above the outlet of the conveying duct 9, and the cut grass inlet 32 of the grass collector 31 is oriented in the upward direction of the vehicle body. The discharge outlet 37 of the grass collector 31 is orientated in the downward relative to the vehicle body, and the grass collector 31 is brought to the high discharge position. At this point, the lid body 38 of the grass collector 31 is switched to an open state by the swiveling of the lid support bodies 41, as performed by the pair of left and right container opening/closing rods 36, 36. As a result, the cut grass that has accumulated in the grass collector 31 falls unassisted from the discharge outlet 37, and is thereby discharged.

OTHER EMBODIMENTS

According to another possible embodiment of the present invention, a structure is used in place of the support frame 50 described in the embodiment above, wherein the grass collector 31 is supported so as to be swivelably switched between a grass collecting position and a low discharge position, without being vertically movably supported. The objects of the present invention can be achieved in this case as well.

What is claimed is:

1. A lawn mower, comprising:
a vehicle body that is supported by a plurality of wheels;
a support frame that is connected to a rear part of the vehicle body, including:
    a pair of right and left arms extending rearward from the vehicle body; and
    a holding frame linked to the arms, including:
        a pair of right and left connecting plates connected to respective arms; and
        a connecting member bridging the right and left connecting plates;
a grass collector that is supported on the support frame so as to be pivoted between a grass collecting position and a discharge position about an axis oriented in a transverse direction of the vehicle body, the grass collector having a bottom wall with a lower surface generally oriented downward when the grass collector is in the grass collecting position;
a rotating shaft extending between the connecting plates and rotatably supported on the connecting plates, the rotating shaft being disposed in the vicinity of a rear end of the bottom wall of the grass collector, the grass collector being mounted on the rotating shaft to be rotated in unison, the rotating shaft being adapted to create a pivot axis for pivotal movement of the grass collector between the grass collecting position and the discharge position;
a swiveling mechanism that is connected to the rotating shaft of the grass collector to be rotated in unison to allow the grass collector to pivot through the rotating shaft including:
    a support member supported on the connecting member; and
    a swiveling body that is connected to the rotating shaft to be rotated in unison; and
a cylinder connected to the support member at one end thereof and to the swiveling body at the other end thereof; wherein
the swiveling mechanism and the cylinder are disposed below and rearward of the grass collector in the grass collecting position, and the cylinder extends along the lower surface of the grass collector;
the lower surface of the grass collector has a recess portion that is formed along a longitudinal direction of the vehicle body in a central region of the bottom wall of the grass collector with respect to the transverse direction, so as to separate at least a portion of a space proximal to an opposite surface of the bottom wall into right and left sides of the vehicle body, the opposite surface being positioned opposite from the lower surface of the bottom wall, and
when the grass collector is in the grass collecting position, the swiveling mechanism and the cylinder are located within the recess portion movably without interference with the recess portion.

2. The lawn mower according to claim 1 wherein
the cylinder has a longitudinal direction in which the cylinder extends;
the swiveling body and the cylinder are connected via a pivot shaft; and
in a lateral view, an angle formed by a line connecting the rotating shaft and the pivot shaft and by the longitudinal direction of the cylinder exceeds through 90° in a process in which the grass collector is pivoted from the grass collecting position to the discharge position.

3. The lawn mower according to claim 2, wherein
the support member is supported at a central region of the connecting member; and
the swiveling body is supported at a central region of the rotating shaft.

4. The lawn mower according to claim 1, further comprising:
an operator's area,
an engine disposed forwardly of the operator's area wherein the plurality of wheels have a pair of front wheels and a pair of rear wheels;
a mower unit disposed between the pair of front wheels and the pair of rear wheels; and
a duct that extends between the mower unit and the grass collector so that the duct extends along a longitudinal direction at a position between the pair of rear wheels.

5. The lawn mower according to claim 4, wherein when the grass collector is in the grass collecting position,
the recess portion comprises an upper wall portion and two lateral wall portions, and
the upper wall portion is generally inclined rearward and upward in a lateral view.

6. The lawn mower according to claim 1, wherein
when the grass collector is in the grass collecting position, the recess portion comprises an upper wall portion with a bottom surface and two lateral wall portions, and
the upper wall portion is generally inclined rearward and upward in a lateral view.

7. The lawn mower according to claim 6, wherein
when the grass collector is in the grass collecting position, an axis of the cylinder is arranged in approximate parallel with a plane of the upper wall portion of the recess portion so that the cylinder and the upper wall portion are in most proximity to each other, and
when the grass collector is in the discharge position, the cylinder is away from the upper wall portion in such a manner that the axis of the cylinder is at an angle with the plane of the upper wall portion.

* * * * *

UNITED STATES PATENT AND TRADEMARK OFFICE
CERTIFICATE OF CORRECTION

| | |
|---|---|
| PATENT NO. | : 7,730,706 B2 |
| APPLICATION NO. | : 12/051818 |
| DATED | : June 8, 2010 |
| INVENTOR(S) | : Ogata et al. |

It is certified that error appears in the above-identified patent and that said Letters Patent is hereby corrected as shown below:

Column 8, lines 47-48, Claim 6, delete "with a bottom surface"

Signed and Sealed this

Nineteenth Day of October, 2010

David J. Kappos
*Director of the United States Patent and Trademark Office*